(12) United States Patent
Yuan (10) Patent No.: US 11,046,583 B2
(45) Date of Patent: Jun. 29, 2021

(54) WAVE-TO-HEAT CONVERSION STRUCTURE AND APPLICATION THEREOF

(71) Applicant: NINGBO SINYUAN INDUSTRY GROUP CO., LTD., Ningbo (CN)

(72) Inventor: YiLin Yuan, Ningbo (CN)

(73) Assignee: NINGBO SINYUAN INDUSTRY GROUP CO., LTD., Ningbo (CN)

( * ) Notice: Subject to any disclaimer, the term of this patent is extended or adjusted under 35 U.S.C. 154(b) by 750 days.

(21) Appl. No.: 15/802,485

(22) Filed: Nov. 3, 2017

(65) Prior Publication Data

US 2018/0077753 A1 Mar. 15, 2018

Related U.S. Application Data

(63) Continuation of application No. PCT/CN2016/081279, filed on May 6, 2016.

(30) Foreign Application Priority Data

May 8, 2015 (CN) .......................... 201510230031.0
May 8, 2015 (CN) .......................... 201510230041.4

(51) Int. Cl.
*C01B 32/158* (2017.01)
*C04B 35/536* (2006.01)
(Continued)

(52) U.S. Cl.
CPC .............. *C01B 32/158* (2017.08); *B32B 5/02* (2013.01); *C04B 35/536* (2013.01);
(Continued)

(58) Field of Classification Search
CPC . B32B 5/02; B32B 2307/302; B32B 2307/72; B32B 2309/105; C01B 32/158;
(Continued)

(56) References Cited

U.S. PATENT DOCUMENTS

2005/0051538 A1* 3/2005 Guckert ............. H01C 17/0652
219/544
2006/0272796 A1* 12/2006 Asmussen ................ H05B 3/36
165/53

(Continued)

FOREIGN PATENT DOCUMENTS

CN 103456520A A 12/2013
CN 104193290A A 12/2014

OTHER PUBLICATIONS

DE First Office Action.

*Primary Examiner* — Eric S Ruppert
*Assistant Examiner* — Hans R Weiland (57) ABSTRACT

The present disclosure provides a wave-to-heat conversion structure. The wave-to-heat conversion structure is a loose tissue formed by a plurality of intersect and hooking fibrous structures. The loose tissue retains a dendritic structure of the fibrous structure, and a plurality of micro-gaps are formed between the fibrous structures. The wave-to-heat conversion structure further includes a heat conductive layer, and the heat conduction coefficient of the heat conductive layer is ranged from about 10 W/m·K to 3000 W/m·K. The present disclosure provides a wave-to-heat conversion spectrum plate using the wave-to-heat conversion structure.

11 Claims, 7 Drawing Sheets

(51) Int. Cl.
  *B32B 5/02* (2006.01)
  *E04B 1/76* (2006.01)
  *H05B 3/00* (2006.01)
  *E04F 13/08* (2006.01)
  *E04F 13/16* (2006.01)

(52) U.S. Cl.
  CPC ......... *E04B 1/7608* (2013.01); *H05B 3/0033* (2013.01); *B32B 2307/302* (2013.01); *B32B 2307/72* (2013.01); *B32B 2309/105* (2013.01); *C04B 2235/425* (2013.01); *C04B 2235/5288* (2013.01); *E04F 13/0866* (2013.01); *E04F 13/16* (2013.01)

(58) Field of Classification Search
  CPC ............ C04B 35/536; C04B 2235/425; C04B 2235/5288; E04F 13/0866; E04B 1/7608; F24F 5/0089; F28D 2245/06; F28D 2255/20; H05B 3/0033
  See application file for complete search history.

(56) References Cited

U.S. PATENT DOCUMENTS

| | | | | |
|---|---|---|---|---|
| 2009/0056854 A1* | 3/2009 | Oh | ................ | C09D 5/24 156/60 |
| 2009/0101306 A1* | 4/2009 | Reis | ................ | F24D 3/148 165/56 |
| 2010/0124025 A1* | 5/2010 | Yamaguchi | ......... | H01L 23/433 361/708 |
| 2011/0061852 A1* | 3/2011 | Tashiro | ................ | C08L 21/00 165/185 |
| 2012/0064361 A1* | 3/2012 | Suwa | ................ | H01L 23/3733 428/600 |
| 2012/0090820 A1* | 4/2012 | Feichtinger | ............... | F24D 3/14 165/135 |
| 2013/0160983 A1* | 6/2013 | Zhang | ................ | H01L 23/3737 165/185 |
| 2014/0034282 A1* | 2/2014 | Kawamura | ............ | C25D 15/00 165/185 |
| 2014/0124186 A1* | 5/2014 | Suwa | ................ | F28F 21/02 165/185 |
| 2014/0196867 A1* | 7/2014 | Tarraga Sanchez | .... | F24D 3/142 165/49 |
| 2014/0224466 A1* | 8/2014 | Lin | ................ | H01L 23/3737 165/185 |
| 2015/0000888 A1* | 1/2015 | Langer | ................ | B32B 5/245 165/185 |
| 2015/0047807 A1* | 2/2015 | Fiedrich | ................ | F28F 1/00 165/56 |
| 2015/0226440 A1* | 8/2015 | Lipinski | ................ | F24D 3/16 165/47 |
| 2015/0252241 A1* | 9/2015 | Jang | ................ | B82Y 30/00 252/74 |
| 2016/0168037 A1* | 6/2016 | Chu | ................ | B29C 41/20 428/408 |
| 2016/0363396 A1* | 12/2016 | Liu | ................ | F28B 1/06 |
| 2016/0376487 A1* | 12/2016 | Abramson | ............. | B32B 27/38 428/408 |

* cited by examiner

WAVE-TO-HEAT CONVERSION STRUCTURE AND APPLICATION THEREOF

FIELD OF THE DISCLOSURE

The present disclosure relates to wave-to-heat conversion and heat-to-wave conversion technologies, in particular, relates to a wave-to-heat conversion structure capable of achieving high bi-directional conversion efficiency between wave and heat and applications of the wave-to-heat conversion structure.

BACKGROUND OF THE DISCLOSURE

According to the thermophysics theorem, all objects with temperature above absolute zero can produce heat radiation. When the heat radiation projects on a surface of an object, there will be three phenomena of absorption, reflection and penetration. The greater the thermal emissivity of thermal energy, the greater the proportion of energy radiated from the material to that of being absorbed.

In contrast to heat conduction and heat convection, heat radiation has an advantage which does not require contact and a medium. The existing heat radiation source is generally made of metal material, heat-to-wave conversion efficiency at room temperature is only about 20%-30%, there is a problem of low efficiency. And it is difficult to directly convert the metal material as a heat radiation, absorbing material in order to achieve the heat-to-wave conversion.

SUMMARY

In view of the above-mentioned problems, it is an object of the present disclosure to provide a wave-to-heat conversion structure capable of achieving high bi-directional conversion efficiency between wave and heat and applications of the wave-to-heat conversion structure, to solve the problems in the prior art.

The present disclosure provides a wave-to-heat conversion structure. The wave-to-heat conversion structure is a loose tissue formed by a plurality of intersect and hooking fibrous structures. The loose tissue retains a dendritic structure of the fibrous structure, and a plurality of micro-gaps are formed between the fibrous structures.

Wherein, the plurality of fibrous structures is arranged in a pile.

Wherein, the fibrous structure is made of carbon nanotubes, expanded graphite, or a mixture of the expanded graphite and the carbon nanotubes.

Wherein, the material of the fibrous structure is metal microfiber, boron nitride fiber, or fibrous material of carbon elements.

Wherein, the size of the cross section of the fibrous structure is ranged from about 10 nanometers to 100 nanometers.

Wherein, the wave-to-heat conversion structure further comprises a heat conductive layer, and the heat conduction coefficient of the heat conductive layer is ranged from about 10 W/m·K to 3000 W/m·K.

Wherein, the material of the heat conductive layer is carbon-based material or metal.

Wherein, the density of the heat conductive layer is ranged from about 0.01 g/cm$^3$ to 1.5 g/cm$^3$, and the thickness of the heat conductive layer is ranged from about 0.1 mm to 10 mm.

Wherein, the density of the heat conductive layer is ranged from about 0.4 g/cm$^3$ to 1.2 g/cm$^3$, and the thickness of the heat conductive layer is ranged from about 0.1 mm to 5 mm.

Wherein, the thickness of the wave-to-heat conversion structure is ranged from about 2 microns to 10 mm.

The present disclosure also provides a wave-to-heat conversion spectrum plate using the above-mentioned wave-to-heat conversion structure. The wave-to-heat conversion spectrum plate comprises an insulating layer, a heat source, an oriented thermal conductive block, and a wave-to-heat conversion structure. The insulating layer is configured to fix the oriented thermal conductive block. The oriented thermal conductive block is arranged in the insulating layer. The heat source is arranged in the oriented thermal conductive block. At least one side of the oriented thermal conductive block is provided with the wave-to-heat conversion structure and is in contact with the wave-to-heat conversion structure. The wave-to-heat conversion structure comprises a wave-to-heat conversion layer. The wave-to-heat conversion structure is a loose tissue formed by a plurality of intersect and hooking fibrous structures. The loose tissue retains a dendritic structure of the fibrous structure, and a plurality of micro-gaps are formed between the fibrous structures.

Wherein, the wave-to-heat conversion structure further comprises a heat conductive layer. The wave-to-heat conversion layer is arranged on the heat conductive layer. The heat conductive layer is in contact with the oriented thermal conductive block, and the heat conduction coefficient of the heat conductive layer is ranged from about 10 W/m·K to 3000 W/m·K.

Wherein, a portion of a surface of the heat source is in contact with the heat conductive layer of the wave-to-heat conversion layer.

Wherein, the material of the heat source is metal or thermally conductive plastic.

Wherein, the oriented thermal conductive block comprises a first sub-oriented thermal conductive block and a second sub-oriented thermal conductive block which are separated from each other. An accommodating space is formed between the first sub-oriented thermal conductive block and the second sub-oriented thermal conductive block to accommodate the heat source.

Compared with, prior arts, the wave-to-heat conversion structure is a loose tissue formed by a plurality of intersect and hooking fibrous structures. The loose tissue retains a dendritic structure of the fibrous structure, and a plurality of micro-gaps are formed between the fibrous structures. The dendritic structure of the fibrous structures can sever as antenna to facilitate the heat radiation effect. The micro gaps are configured to achieve the black hole effect, that is, a bidirectional conversion of heat and infrared rays.

The wave-to-heat conversion structure further comprises a heat conductive layer. The heat conduction coefficient of the heat conductive layer is ranged from about 10 W/m·K to 3000 W/m·K, so that the heat conductive layer has a good heat conductive effect, and the heat can be transferred to the fibrous structure fast.

The wave-to-heat conversion structure has high thermal emissivity and heat-to-wave conversion efficiency. When the external environment is room temperature, the heat-to-wave conversion efficiency of the wave-to-heat conversion structure and the wave-to-heat conversion spectrum plate can be up to 80% and above, and specifically, in the environment in which the temperature difference between the external environment and the wave-to-heat conversion structure or the wave-to-heat conversion spectrum plate is about 3 degrees Celsius, the heat-to-wave conversion efficiency can be up to 60% and above. The greater the temperature difference is, the higher the heat-to-wave conversion efficiency is.

DETAILED DESCRIPTION OF ILLUSTRATED EMBODIMENTS

To make the objectives, technical solutions, and advantages of the present disclosure clearer, the present disclosure is further described in, detail in combination with specific embodiments and attached drawings. It should be understood that the embodiments described here are only exemplary ones for illustrating the present disclosure, and are not intended to limit the present disclosure.

Figure 1:
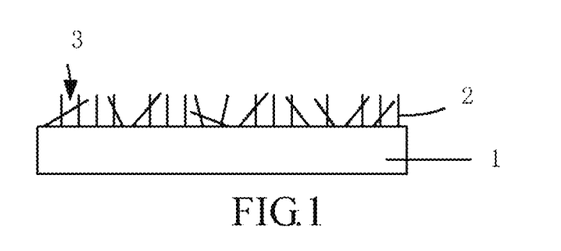
FIG. 1 is a diagrammatic view of a wave-to-heat conversion structure of the present disclosure (wherein 1 represents a heat conductive layer, 2 represents a fibrous structure, and 3 represents a micro gap).

The present disclosure provides a wave-to-heat conversion structure. Referring to FIG. 1, the wave-to-heat conversion structure is a loose tissue formed by a plurality of intersect and hooking fibrous structures 2. The loose tissue retains a dendritic structure of the fibrous structure 2, and a plurality of micro-gaps 3 are formed between the fibrous structures 2.

The plurality of fibrous structures is arranged in a pile. The wave-to-heat conversion structure is configured to achieve bidirectional conversion between wave and heat.

The size of each of the micro gaps 3 is ranged from, about 5 nanometers to 100 nanometers. Preferably, the size of each of the micro gaps 3 is ranged from about 10 nanometers to 50 nanometers. The size of the cross section of the fibrous structure 2 is ranged from about 1 nanometer to 100 nanometers. Preferably, the size of the cross-section of the fibrous structure 2 is ranged from about 1 nanometer to 50 nanometers. More preferably, the size of the cross-section of the fibrous structure 2 is ranged from about 5 nanometers to 50 nanometers. The thickness of the wave-to-heat conversion structure is ranged from about 2 microns to 10 mm. Preferably, the thickness of the wave-to-heat conversion structure is ranged from about 2 microns to 5 mm.

The material of the fibrous structure 2 can be metal microfibers, boron nitride fibers, or fibrous material of carbon elements. Further, the material of the fibrous structure 2 can also be carbon nanotubes, expanded graphite, or a mixture of the expanded graphite and the carbon nanotubes. The function of the fibrous structure 2 is mainly to achieve the bidirectional conversion between the wave and heat, and also as a thermal conduction channel, to achieve rapid heat transfer. In one embodiment, the method for manufacturing the metal microfibers can be etching or the like on a surface of the metal to form the metal microfibers.

In one embodiment, the material of the fibrous structure 2 can be carbon-based material, such as expanded graphite, carbon nanotubes, or a mixture of the expanded graphite and the carbon nanotubes. When the material of the fibrous structure 2 is expanded graphite, a plurality of micro gaps and a fibrous structure can be formed on the surface thereof due to the worm-like structure of the expanded, graphite itself (see FIGS. 2 and 3). The micro gaps contributes to the formation of the black hole effect, absorbs heat radiation; the fibrous structure also contributes to the heat radiation of the body.

When the material of the fibrous structure 2 includes carbon nanotubes, the carbon nanotubes can be single-walled carbon nanotubes, double-walled carbon nanotubes, or multi-walled carbon nanotubes. Because the hole structure of the carbon nanotubes itself has a black hole effect, and the micro gaps between the carbon nanotubes can also have a good black hole effect, so that the bidirectional conversion between wave and heat can be maximized implemented.

The wave-to-heat conversion structure can further includes a heat conductive layer 1. The plurality of fibrous structures are arranged on a surface of the heat conductive layer 1. The heat conductive layer 1 is configured to conduct heat.

Figure 4:
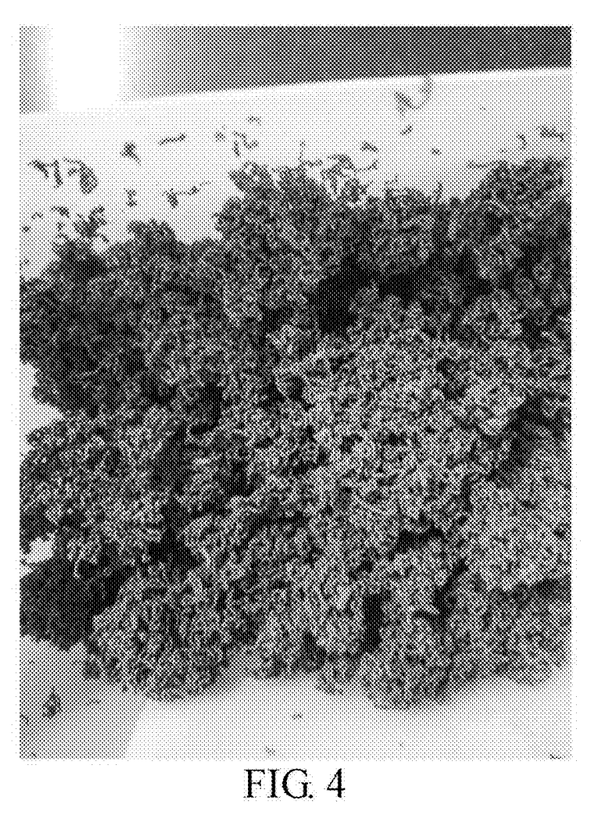
FIG. 4 is a photograph of a multilayered graphene structure having 50 to 250 layers obtained by secondary expansion of graphite, according to an embodiment of the present disclosure.

The heat conduction coefficient of the heat conductive layer 1 is ranged from about 10 W/m·K to 3000 W/m·K. Preferably, the heat conduction coefficient of the heat conductive layer 1 is ranged from about 10 W/m·K to 3000 W/m·K. More preferably, the heat conduction coefficient of the heat conductive layer 1 is ranged from about 10 W/m·K to 3000 W/m·K. The material of the heat conductive layer 1 can be carbon-based material or metal. The carbon-based material can be at least one of expanded graphite, carbon nanotubes, and graphene. Particularly, the carbon-based material can be a composite material of expanded graphite, graphene-like particles, and carbon nanotubes. The expanded graphite is a multilayer graphene structure having about 50~$10^3$ layers. The method for manufacturing the expanded graphite is processing the graphite in a primary expansion way. The graphene-like particles is a multilayer graphene structure having about 50~250 layers, which is first processed in a secondary expansion way, and then crushed. Referring to FIG. 4, a multilayer graphene structure having about 50~250 layers and processed in a secondary expansion way is shown. The bulk density of the graphene-like particles is ranged from about 0.15 g/cm$^3$ to 0.3 g/cm$^3$. Preferably, the bulk density of the graphene-like particles is ranged from about 0.2 g/cm$^3$ to 0.25 g/cm$^3$. The apparent particle size of the graphene-like particles is ranged from about of 50 to 300. Preferably, the apparent particle size of the graphene-like particles is ranged from, about 150 to 200.

When the material of the heat conductive layer 1 includes carbon nanotubes, the carbon nanotubes can be single-walled carbon nanotubes, double-walled carbon nanotubes, or multi-walled carbon nanotubes. In this case, in order to distinguish the carbon nanotubes in the heat conductive layer 1 and the carbon nanotubes in the fibrous structure, the carbon nanotubes in the heat conductive layer 1 are called the first carbon nanotubes, and the carbon nanotubes in the fibrous structure 2 are called the second carbon nanotubes.

The heat conductive layer 1 can be directly formed by pressing the mixture of the expanded graphite, the graphene-like particles, and the first carbon nanotubes. The heat conductive layer 1 can also be formed by means of first pressing the mixture of the expanded graphite, the graphene-like particles, and then putting the first carbon nanotubes to be pressed. The graphene-like particles and the first carbon nanotubes are evenly distributed in the expanded graphite, and are configured to improve the heat-conducting property of the expanded graphite. The multilayer graphene structure of the expanded graphite results that the expanded graphite just has a good heat-conducting property in a direction parallel to a surface of the expanded graphite. By adding the graphene-like particles and the first carbon nanotubes into the expanded graphite, a thermally conductive channel can be established between the layers to form a three-dimensional thermally conductive network, thereby resulting an excellent heat-conducting property of the composite material in all directions.

When the heat conductive layer 1 is a composite material of the expanded graphite, the graphene-like particles and the first carbon nanotubes, the mass percent of the expanded graphite in the heat conductive layer 1 is greater than or equal to 70% and less than 100%, the mass percent of the graphene-like particles in the heat conductive layer 1 is larger than 0 and less than 30%, and the mass percent of the first carbon nanotubes is larger than 0 and less than 30%. Preferably, the mass percent of the expanded graphite in the heat conductive layer 1 is greater than or equal to 70% and less than 80%, the mass percent of the graphene-like particles in the heat conductive layer 1 is larger than 10%, and less than or equal to 20%, and the mass percent of the first carbon nanotubes is larger than 10%, and less than or equal to 20%.

Figure 2:
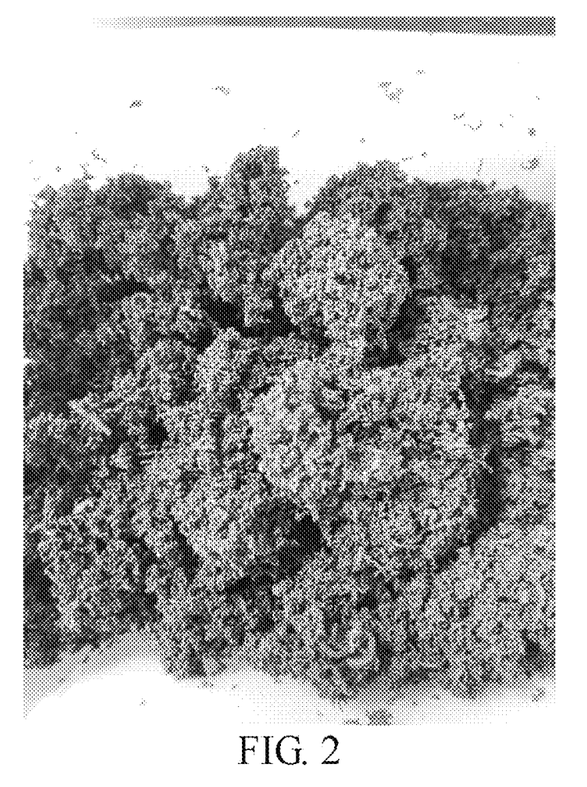
FIG. 2 is a photograph of expanded graphite in an embodiment of the present disclosure.
Figure 3:
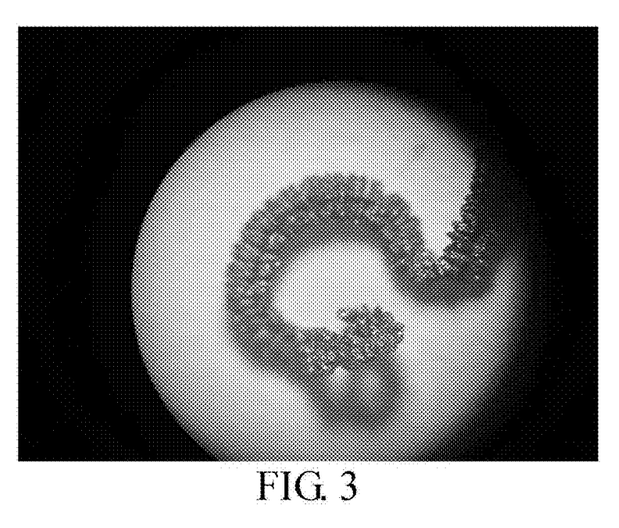
FIG. 3 is a microphotograph of the expanded graphite of FIG. 2.

In one embodiment, the material of the heat conductive layer 1 can be only the expanded graphite. The expanded graphite is a multilayer graphene structure having about 50~$10^3$ layers. As shown in FIGS. 2 and 3, the expanded graphite is worm-like. The expanded graphite can be manufactured by graphite.

The density of the heat conductive layer 1 is ranged from about 0.01 g/cm$^3$ to 1.5 g/cm$^3$, and the thickness of the heat conductive layer 1 is ranged from about 0.1 mm to 10 mm. Preferably, in order to make the wave-to-heat conversion structure have excellent thermal conductivity and thermal emissivity, the density of the heat conductive layer 1 is ranged from about 0.4 g/cm$^3$ to 1.2 g/cm$^3$, and the thickness of the heat conductive layer 1 is ranged from about 0.1 mm to 5 mm.

When the wave-to-heat conversion structure includes a heat conductive layer 1 and a fibrous structures 2, and both the heat conductive layer 1 and the fibrous structures 2 are made of the expanded graphite, the expanded graphite material can be first pressed into a layered structure as the heat conductive layer 1, and then the other expanded graphite material is tampered with a small pressure or directly adhered to a surface of the heat conductive layer 1 by an adhesive or the like to form the fibrous structure 2. In this case, the material of the heat conductive layer 1 and the fibrous structure 2 are the same, but the densities of those are different.

When the wave-to-heat conversion structure includes only the fibrous structures 2. The expanded graphite can be primary directly pressed into the wave-to-heat conversion structure. At this time, the wave-to-heat conversion structure includes only a plurality of the fibrous structures 2, and does not include the heat conductive layer 1.

When the wave-to-heat conversion structure includes the heat conductive layer 1, and the fibrous structure 2 is the second carbon, nanotube, a plurality of the second carbon nanotubes can be formed on the surface of the heat conductive layer 1 by direct growth, adhesion or the like. The plurality of second carbon nanotubes may be perpendicular to the surface of the heat conductive layer 1, or can be arranged in a disordered manner. The second carbon nanotubes extend outwardly from the surface of the heat conductive layer 1. Particularly, a portion of the second carbon nanotubes can be perpendicular to, the surface of the heat conductive layer 1, and the other portion of the second carbon nanotubes can form an obtuse or an acute angle with the surface of the heat conductive layer 1, so that neighboring second carbon nanotubes are intertwined with each other. Preferably, the second carbon nanotubes are substantially perpendicular to the surface of the heat conductive layer 1, which refers to the majority of the second carbon nanotubes are perpendicular to the surface of the heat conductive layer 1, and does not preclude that a few of the second carbon nanotubes can form an obtuse or an acute angle with the surface of the heat conductive layer 1.

Compared with prior arts, the wave-to-heat conversion structure is a loose tissue formed by a plurality of intersect and hooking fibrous structures 2. The loose tissue retains a dendritic structure of the fibrous structure 2, and a plurality of micro-gaps 3 are formed between the fibrous structures 2. The fibrous structures 2 are severs as antenna facilitate the heat radiation effect. The micro gaps 3 are configured to achieve to the black hole effect, that is, a bidirectional conversion of heat and infrared rays.

The wave-to-heat conversion structure further includes the heat conductive layer 1. The heat conduction coefficient of the heat conductive layer 1 is ranged from about 10 W/m·K to 3000 W/m·K, so that the heat conductive layer 1 has a good heat conductive effect, and the heat can be transferred to the fibrous structure 2 fast.

The wave-to-heat conversion structure has high thermal emissivity and heat-to-wave conversion efficiency. When the external environment is room temperature, the heat-to-wave conversion efficiency of the wave-to-heat conversion structure can be up to 80% and above, and specifically, in the environment in which the temperature difference between the external environment and the wave-to-heat conversion structure is about 3 degrees Celsius, the heat-to-wave conversion efficiency of the wave-to-heat conversion structure can be up to 60% and above. The greater the temperature difference is, the higher the heat-to-wave conversion efficiency is.

Figure 5:
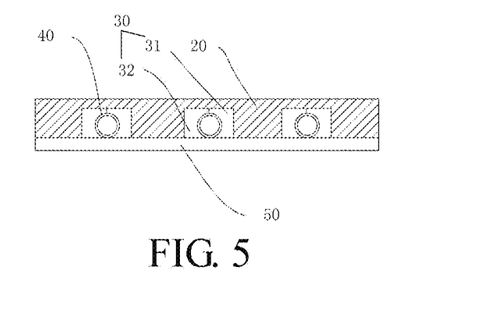
FIG. 5 is a diagrammatic view of a spectrum plate for wave-to-heat conversion, according to a first embodiment of the present disclosure (wherein 20 represents an insulating layer, 30 represents an oriented thermal conductive block, 31 represents a first sub-oriented thermal conductive block, 32 represents a second sub-oriented thermal conductive block, 40 represents a heat source, and 50 represents a wave-to-heat conversion structure).

The present disclosure also provides a wave-to-heat conversion spectrum plate. As shown in FIG. 5, the wave-to-heat conversion spectrum plate includes an insulating layer 20, an oriented, thermal conductive block 30, a heat source 40, and a wave-to-heat conversion structure 50. The insulating layer 20 is configured to fix the oriented thermal conductive block 30. The oriented thermal conductive block 30 is arranged in the insulating layer 20. The heat source 40 is arranged in the oriented thermal conductive block 30. At least one side of the oriented thermal conductive block 30 is provided with the wave-to-heat conversion structure 50 and is in contact with the wave-to-heat conversion structure 50.

The insulating layer 20 is a grooved structure. The material of the insulating, layer 20 is a heat insulating material, such as foam, polystyrene, phenolic resin and the like. Preferably, the material of the insulating layer 20 has flame retardancy and fire resistance.

The oriented thermal conductive block 30 can be embedded in the insulation layer 20. That is, the insulation layer 20 can sandwich the oriented thermal conductive block 30. The oriented theimal conductive block 30 includes a first sub-oriented thermal conductive block 31 and a second sub-oriented thermal conductive block 32 which are separated from each other. An accommodating space is formed between the first sub-oriented thermal conductive block 31 and the second sub oriented thermal conductive block 32 to accommodate the heat source 40. The first sub-oriented thermal conductive block 31 and the second sub-oriented thermal conductive block 32 cover the heat source. The separable combination is advantageous for molding, disassembly, assembly, and transportation.

The material of the oriented thermal conductive block 30 is carbon-based material, which is also advantageous for reducing the weight and facilitating transportation. In particular, the material of the oriented thermal conductive block 30 can be an Educt compound obtained by molding the expanded graphite or the expanded gaphite with the graphene-like particles. At this time, the Educt compound can form a three-dimensional, thermally conductive network between the expanded graphite and the graphene-like particles. The thermal conductivity of the Educt compound in all directions is good. When the material of the oriented thermal conductive block 30 is an Educt compound, the mass ratio of the graphene-like particles in the oriented thermal conductive block 30 is greater than 0 and less than or equal to 25%. The density of the oriented thermal conductive block 30 is ranged from about 0.1 $g/cm^3$ to 1.7 $g/cm^3$. Preferably, in order to provide a higher thermal conductivity, the density of the oriented thermal conductive block 30 is ranged from about 0.8 $g/cm^3$ to 1.7 $g/cm^3$.

The material of the heat source 40 is metal or thermally conductive plastic. When the heat source 40 is made of thermally conductive plastic, the heat source 40 has a thermal conductivity like the carbon-based material, such as graphite, which has high thermal conductivity, and is resistant to corrosion, and has a long service life.

Referring to FIG. 5, the wave-to-heat conversion layer is in contact with the oriented thermal conductive block 30. A portion of a surface of the heat source 40 is in contact with the wave-to-heat conversion layer. The wave-to-heat conversion structure 50 includes a wave-to-heat conversion layer. The wave-to-heat conversion layer is configured to achieve bidirectional conversion between wave and heat.

In one embodiment, the wave-to-heat conversion structure 50 can further include a heat conductive layer 1. The heat conductive layer 1 is configured to conduct heat. The wave-to-heat conversion layer is arranged on the heat conductive layer 1. The heat conductive layer 1 is in contact with the oriented thermal conductive block 30. A portion of the surface of the heat source 40 is in contact with the heat conductive layer 1 of the wave-to-heat conversion structure 50.

The thickness of the wave-to-heat conversion structure 50 is ranged from about 2 microns to 10 mm. Preferably, the thickness of the wave-to-heat conversion structure 50 is ranged from about 2 microns to 5 mm.

Referring to FIG. 5, showing a wave-to-heat conversion spectrum plate, according to a first embodiment of the present disclosure. One side of the oriented thermal conductive block 30 is provided with the wave-to-heat conversion structure 50. That is, one side surface of the oriented thermal conductive block 30 is in contact with the wave-to-heat conversion structure 50, while the wave-to-heat conversion structure 50 is in contact with portions of the surface of the heat source 40. The oriented thermal conductive block 30 serves to increase the heat transfer efficiency between the heat source 40 and the wave-to-heat conversion structure 50 by providing the oriented thermal conductive block 30. The wave-to-heat conversion spectrum plate is suitable for manufacturing a ceiling panel.

Figure 6:
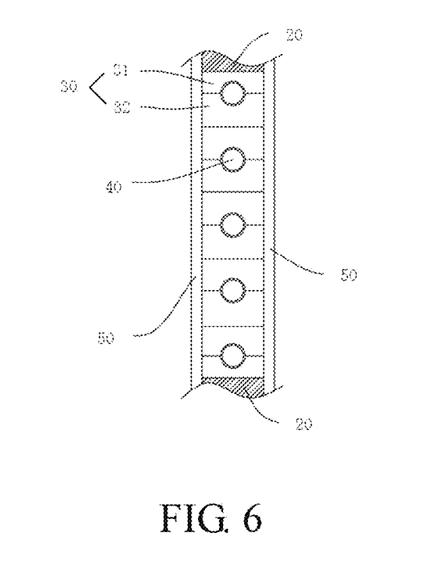
FIG. 6 is a diagrammatic view of a spectrum plate for wave-to-heat conversion, according to a second embodiment of the present disclosure (wherein 20 represents an insulating layer, 30 represents an oriented thermal conductive block, 31 represents a first sub-oriented thermal conductive block, 32 represents a second sub-oriented thermal conductive block, 40 represents a heat source, and 50 represents a wave-to-heat conversion structure).

Referring to FIG. 6, showing a wave-to-heat conversion spectrum plate, according to a second embodiment of the present disclosure. Opposite sides of the oriented thermal conductive block 30 are provided with, the wave-to-heat conversion structure 50. That is, two wave-to-heat conversion structures 50 are arranged at opposite sides of the oriented thermal conductive block 30. The plurality of the oriented thermal conductive blocks 30 are arranged between two insulating layers 20. The heat source 40 is embedded in the oriented thermal conductive block 30. The wave-to-heat conversion spectrum plate is suitable for manufacturing a wall panel, due to the wave-to-heat conversion spectrum plate can facilitate two rooms at opposite sides of the wall panel for heating or refrigeration at the same time.

The wave-to-heat conversion structure 50 is the wave-to-heat conversion structure shown in FIG. 1 of the present disclosure described above, and will not be described again.

The wave-to-heat conversion structure and the wave-to-heat conversion spectrum plate, according to the present disclosure, will be described below with reference to specific embodiments.

The composition and the weight ratio in the following embodiments were selected and molded.

| Embodiment | Mass percent of the expanded graphite | Graphene-like particles Mass percent | Bulk density ($g/cm^3$) | Particle size (mesh) | Mass percent of the carbon nanotubes | Density of the heat conductive layer ($g/cm^3$) | Thickness of the heat conductive layer (mm) | Heat-to-wave conversion efficiency |
|---|---|---|---|---|---|---|---|---|
| 1 | 100% | 0 | 0 | 0 | 0 | 0.01 | 2 | 85 |
| 2 | 90% | 5% | 0.2 | 100 | 5% | 0.4 | 3 | 86 |
| 3 | 80% | 10% | 0.15 | 50 | 10% | 0.1 | 0.1 | 86 |
| 4 | 70% | 30% | 0.15 | 150 | 0 | 0.6 | 3 | 85 |
| 5 | 70% | 0 | 0 | 0 | 30% | 1.2 | 6 | 83 |

-continued

| Embodiment | Mass percent of the expanded graphite | Graphene-like particles | | | Mass percent of the carbon nanotubes | Density of the heat conductive layer (g/cm³) | Thickness of the heat conductive layer (mm) | Heat-to-wave conversion efficiency |
|---|---|---|---|---|---|---|---|---|
| | | Mass percent | Bulk density (g/cm³) | Particle size (mesh) | | | | |
| 6 | 70% | 10% | 0.3 | 200 | 20% | 1.2 | 0.8 | 84 |
| 7 | 70% | 20% | 0.25 | 300 | 10% | 1.5 | 10 | 81 |

Figure 7:
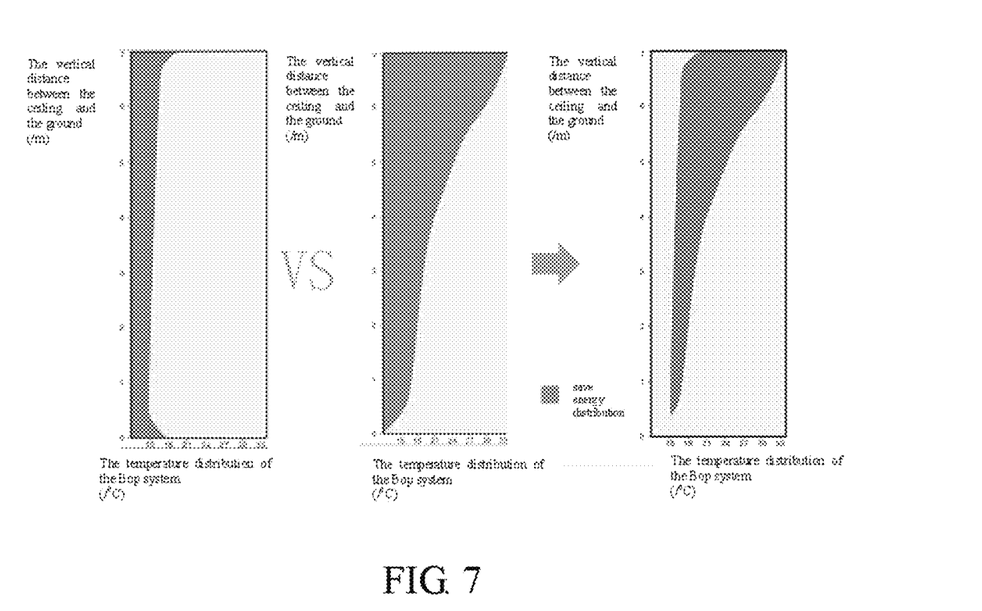
FIG. 7 is a temperature distributed diagram of a room after the wave-to-heat conversion structure of the present disclosure is applied to a ceiling of the room.

As can be seen from the above embodiments, the wave-to-heat conversion structure of the present disclosure has a high heat-to-wave conversion efficiency. Referring to FIG. 7, when the wave-to-heat conversion structure is used as a ceiling, the wave-to-heat conversion structure can save energy compared to the conventional air-condition system. The left side of FIG. 7 shows the temperature distribution in the vertical direction of the room, when the ceiling (spectrum system) using the wave-to-heat conversion structure of the present disclosure works. The middle view of FIG. 7 shows the temperature distribution in the vertical direction of the room, when the conventional air-condition system is in operation. It can be seen that most of the energy is applied to heat the air using hot air convection heating method of the conventional air-condition, and the hot air entrenches the upper part of the room, resulting in energy waste. The spectrum system used in the present disclosure directly radiates heat into people, seats, floors and other objects in a room in a thermal radiation way, thereby avoiding the waste of most of the energy. It can be seen from the right-side view of FIG. 7, the conventional air-condition system consumes more energy than the spectrum system of the present disclosure.

The description of the above embodiments is only for the purpose of understanding the method of the disclosure and its core idea. It should be noted that it will be apparent to those skilled in the art that various modifications and adaptations can be made to the present disclosure without departing from the principles of the invention, which fall within the scope of the appended claims.

The foregoing description of the disclosed embodiments will enable one skilled in the art to, make or use the present disclosure. Various modifications to these embodiments will be apparent to those skilled in the art, and the generic principles defined herein may be embodied in other embodiments without departing from the spirit or scope of the invention. Accordingly, the disclosure is not to be limited to the embodiments shown herein, but is to be accorded the widest scope consistent with the principles and novel features disclosed herein.

What is claimed is:

1. A wave-to-heat conversion structure being a loose tissue formed by a plurality of intersecting and hooking fibrous structures, the loose tissue retaining a dendritic structure of the fibrous structure, and a plurality of micro-gaps formed and existing between the fibrous structures,
   wherein the fibrous structure comprises expanded graphite which is a first multilayer graphene structure having 50-1000 layers,
   the wave-to-heat conversion structure further comprises a heat conductive layer, the fibrous structures are arranged on a surface of the heat conductive layer, the heat conductive layer is configured to conduct heat, the heat conductive layer is a composite material consisting of the expanded graphite, a second multilayer graphene structure having 50-250 layers, and carbon nanotubes,
   the second multilayer graphene structure and the carbon nanotubes are evenly distributed in the expanded graphite to form a three-dimensional thermally conductive network,
   a mass percent of the expanded graphite in the heat conductive layer is greater than or equal to 70% and less than 100%, a mass percent of the second multilayer graphene structure in the heat conductive layer is larger than 0 and less than 30%, and a mass percent of the carbon nanotubes is larger than 0 and less than 30%.

2. The wave-to-heat conversion structure of claim 1, wherein the plurality of fibrous structures are arranged in a pile.

3. The wave-to-heat conversion structure of claim 1, wherein the heat conduction coefficient of the heat conductive layer is ranged from about 10 W/m·K to 3000 W/m·K.

4. The wave-to-heat conversion structure of claim 3, wherein the density of the heat conductive layer is ranged from about 0.01 g/cm³ to 1.5 g/cm³, and the thickness of the heat conductive layer is ranged from about 0.1 mm to 10 mm.

5. The wave-to-heat conversion structure of claim 4, wherein the density of the heat conductive layer is ranged from about 0.4 g/cm³ to 1.2 g/cm³, and the thickness of the heat conductive layer is ranged from about 0.1 mm to 5 mm.

6. The wave-to-heat conversion structure of claim 1, wherein the thickness of the wave-to-heat conversion structure is ranged from about 2 microns to 10 mm.

7. A wave-to-heat conversion spectrum plate using the wave-to-heat conversion structure of claim 1, wherein the wave-to-heat conversion spectrum plate comprises an insulating layer, a heat source, an oriented thermal conductive block, and a wave-to-heat conversion structure, the insulating layer is configured to fix the oriented thermal conductive block, the oriented thermal conductive block is arranged in the insulating layer, the heat source is arranged in the oriented thermal conductive block, at least one side of the oriented thermal conductive block is provided with the wave-to-heat conversion structure and is in contact with the wave-to-heat conversion structure, the wave-to-heat conversion structure comprises a wave-to-heat conversion layer.

8. The wave-to-heat conversion spectrum plate of claim 7, wherein the wave-to-heat conversion layer is arranged on the heat conductive layer, the heat conductive layer is in contact with the oriented thermal conductive block, and the heat conduction coefficient of the heat conductive layer is ranged from about 10 W/m·K to 3000 W/m·K.

9. The wave-to-heat conversion spectrum plate of claim 8, wherein a portion of a surface of the heat source is in contact with the heat conductive layer of the wave-to-heat conversion layer.

10. The wave-to-heat conversion spectrum plate of claim 7, wherein the material of the heat source is metal or thermally conductive plastic.

11. The wave-to-heat conversion spectrum plate of claim 7, wherein the oriented thermal conductive block comprises a first sub-oriented thermal conductive block and a second sub-oriented thermal conductive block which are separated from each other, and an accommodating space is formed between the first sub-oriented thermal conductive block and the second sub-oriented thermal conductive block to accommodate the heat source.

* * * * *